(12) United States Patent
Sim (10) Patent No.: US 7,440,446 B2
(45) Date of Patent: Oct. 21, 2008

(54) VOICE OVER PACKET SYSTEM USING A PLURALITY OF DIGITAL SIGNAL PROCESSORS AND SPEECH PROCESSING METHOD THEREIN

(75) Inventor: Jaecheol Sim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 781 days.

(21) Appl. No.: 10/940,789

(22) Filed: Sep. 13, 2004

(65) Prior Publication Data

US 2005/0141520 A1     Jun. 30, 2005

(30) Foreign Application Priority Data

Dec. 26, 2003    (KR)   ....................... 10-2003-0097759

(51) Int. Cl.
*H04L 12/64*     (2006.01)
*H04L 12/28*     (2006.01)

(52) U.S. Cl. ......................... 370/356; 370/401; 379/900

(58) Field of Classification Search ......... 370/352–356, 370/389, 401, 465–467; 379/900; 709/213–216
See application file for complete search history.

(56) References Cited

U.S. PATENT DOCUMENTS

| | | | | |
|---|---|---|---|---|
| 5,497,373 | A * | 3/1996 | Hulen et al. ................ | 370/259 |
| 6,266,342 | B1 * | 7/2001 | Stacey et al. ................ | 370/465 |
| 6,269,095 | B1 | 7/2001 | Neubauer et al. | |
| 6,766,423 | B2 * | 7/2004 | Mills et al. .................. | 711/147 |
| 6,925,641 | B1 * | 8/2005 | Elabd .......................... | 718/101 |

(Continued)

FOREIGN PATENT DOCUMENTS

KR    1993-0005843     6/1993

(Continued)

OTHER PUBLICATIONS

"Two-Stage DSP Processing Architecture for VoIP Gateways", J. Sim, Dec. 4, 2003, Seventh NCS 2003, Next Generation Communication Software (with translation).

*Primary Examiner*—Chi H. Pham
*Assistant Examiner*—Ahmed Elallam
(74) *Attorney, Agent, or Firm*—Blakely, Sokoloff, Taylor & Zafman (57) ABSTRACT

A voice over packet (VoP) system using a plurality of digital signal processors (DSPs) and a speech processing method are provided. A plurality of first-stage DSPs perform encoding voice signal of calls allocated in advance, among calls from a circuit network, and output packets corresponding to the voice signal. A plurality of first memories are disposed corresponding to the plurality of first-stage DSPs, respectively, and store feature data obtained from calls input by the plurality of first-stage DSPs, respectively. A second memory stores feature data of the number of calls exceeding the processing capacity of first-stage DSPs among the calls input from the circuit network. A second-stage DSP performs encoding voice signal stored in the second memory and outputs packets corresponding to voice signal stored in the second memory. A packet network interface collects processing results of the first-stage DSPs and the second-stage DSP and distributes inputs from a packet network to first-stage DSPs. Based on identification information added to the feature data stored in the second memory, each of the first-stage DSPs moves the feature data to the first memory disposed corresponding to the first-stage DSP.

13 Claims, 6 Drawing Sheets

U.S. PATENT DOCUMENTS

| | | | |
|---|---|---|---|
| 7,003,093 B2 * | 2/2006 | Prabhu et al. | 379/390.02 |
| 7,009,962 B1 * | 3/2006 | Chung et al. | 370/356 |
| 7,301,933 B1 * | 11/2007 | Baggs et al. | 370/352 |
| 2002/0031086 A1 * | 3/2002 | Welin | 370/229 |
| 2002/0112097 A1 | 8/2002 | Milovanovic et al. | |
| 2002/0116186 A1 * | 8/2002 | Strauss et al. | 704/233 |
| 2002/0144065 A1 * | 10/2002 | Mills et al. | 711/147 |
| 2003/0128715 A1 * | 7/2003 | Deo et al. | 370/442 |
| 2006/0287742 A1 * | 12/2006 | Khan et al. | 700/90 |

FOREIGN PATENT DOCUMENTS

| | | |
|---|---|---|
| WO | WO 01/35228 A3 | 5/2001 |

* cited by examiner

VOICE OVER PACKET SYSTEM USING A PLURALITY OF DIGITAL SIGNAL PROCESSORS AND SPEECH PROCESSING METHOD THEREIN

This application claims the priority of Korean Patent Application No. 2003-97759, filed on Dec. 26, 2003, in the Korean Intellectual Property Office, the disclosure of which is incorporated herein in its entirety by reference.

BACKGROUND OF THE INVENTION

1. Field of the Invention

The present invention relates to a voice over packet (VoP) system using a plurality of digital signal processors (DSPs) and a speech processing method in the system, and more particularly, to a VoP system in which voice and packets are converted into each other by a plurality of DSPs and transferred between a circuit network and a packet network, and a speech processing method in the system.

2. Description of the Related Art

A VoP system performs a function to convert voice between a packet network and a telephone network. An algorithm for processing voice is executed in a DSP. In a VoP system, DSPs process a plurality of voice channels, and appropriate algorithms for each channel are executed at an appropriate time such that scheduling is performed in order to process the plurality of channels without degradation in sound quality.

In order to implement a higher processing capability in a DSP, a DSP chip embedding a plurality of DSP cores is becoming widely used. A media gateway (MG), a system for VoP service, especially a large capacity system for network providers, processes hundreds or thousands of channels at the same time and executes algorithms for processing a variety of voice codecs, modems, and faxes. These algorithms are processed by DSPs, components of the MG. Also, for a large capacity system, a plurality of DSPs are arranged in parallel and process algorithms independently.

Figure 1:
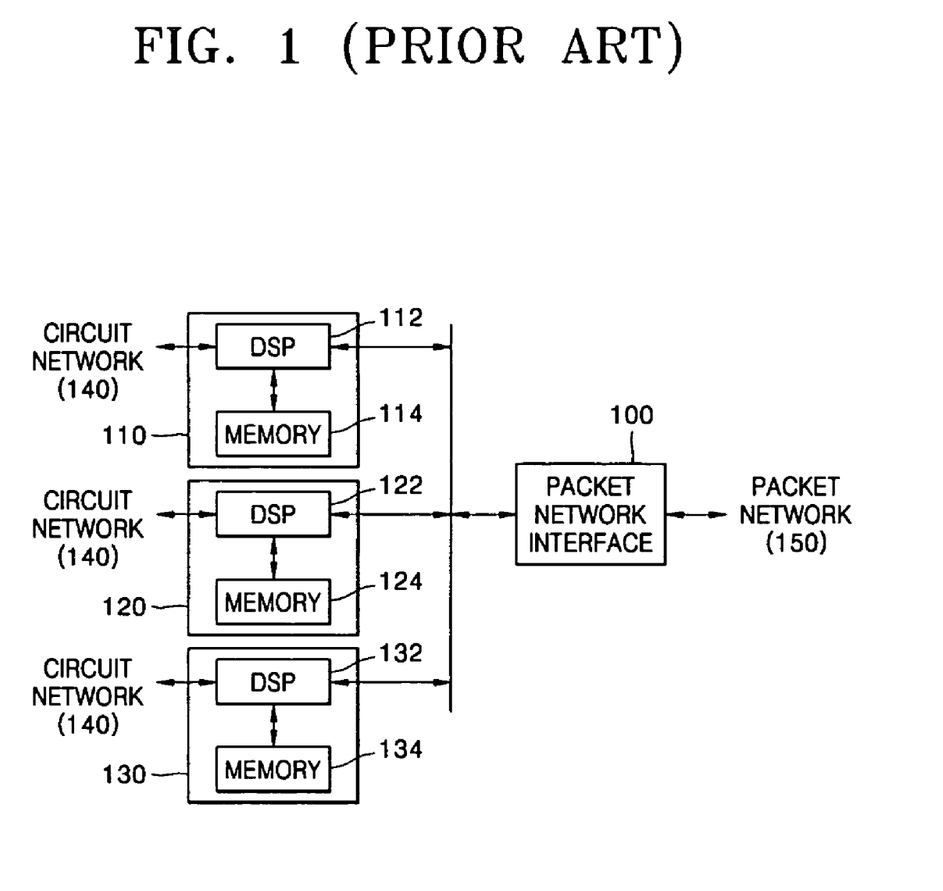
FIG. 1 is a diagram showing the structure of a conventional multiple DSP VoP system.

FIG. 1 is a diagram showing the structure of a conventional multiple DSP VoP system.

Referring to FIG. 1, the conventional multiple DSP VoP system includes a packet network interface 100, and a plurality of DSP blocks 110, 120, and 130. Each of the DSP blocks 110, 120, and 130 includes a DSP 112, 122, 132, and a memory 114, 124, and 134, and is connected to the packet network interface 100 serially or in parallel. In this conventional multiple DSP VoP system, a plurality of algorithms are used to provide one channel service.

The DSP executes algorithms, including echo canceling, automatic gain control, voice activity detect (VAD), DTMF tone detect, and voice coding/decoding for signal input from a circuit network 140 such as a telephone network, and then the encoded signal is packetized and transmitted to a packet network 150. Meanwhile, a packet input form the packet network 150 is processed by a voice decoding algorithm or a tone generation algorithm, and then the processed signal is transmitted to the circuit network 140. The processing capacity of the DSPs 112, 122, and 132 required to execute these DSP algorithms varies depending input data. In particular, it is known that in a voice call, speech intervals and silence intervals alternate repeatedly. In addition, the processing capacity of the DSPs 112, 122, and 132 required for encoding voice input from the circuit network 140 to transmit it to the packet network 150 changes tens of times depending on whether it is a speech interval or a silence interval.

When a plurality of voice calls are allocated to each DSP 112,122, and 132, the required processing capacity tends to be averaged. In spite of this tendency, the processing load of the DSP 112, 122, and 132 required at each time point fluctuates greatly, much higher or much lower than the average load. Meanwhile, the processing capacity of DSPs 112, 122, and 132 required to decode packetized voice from the packet network 150 to the circuit network 140 does not change depending on whether it is a speech interval or a silence interval, and needs only about one tenth of that for encoding.

The maximum number of calls to be accommodated by each DSP 112, 122, and 132 can be calculated on the basis of the maximum processing capacity required by each algorithm, the number of calls that can be processed by one DSP 112, 122, and 132 is determined. However, though this method is the safest one, the processing capacity of the DSPs 112,122, and 132 cannot be utilized to the maximum. The ratio between speech intervals and silence intervals during calls is known to be about 4 to 6. Accordingly, only about 40% of the processing capacity of the DSPs 112, 122, and 132 can be utilized. If the maximum number of calls is determined on the basis of average processing load, DSPs may be utilized to their maximum. But, when some number of calls are in speech interval, whole processing for all calls may not be finished in a predetermined interval such that the quality of voice is not degraded.

A variety of methods have been suggested to execute DSP algorithms requiring different processing capacities at each time point in the conventional multiple DSP VoP system. In particular, the U.S. Pat. No. 5,995,540 discloses a method to prevent waste of DSP processing capacity. According to the method, after finishing execution of DSP algorithms in each cycle, DSP executes user application programs with the remaining processing capacity. However, This method may be applied to the system executing user application programs and DSP algorithms in a DSP. However, the multiple DSP VoP system is aimed to execute only limited DSP jobs.

In addition, International Application Gazette WO 01/35228 discloses a scheduling method for determining the number of channels to be accommodated in one DSP on the basis of the average processing load of each algorithm, and a processing method when algorithms cannot be finished in a predetermined time, in particular. In this method, it is checked at the beginning of each cycle whether or not every channels allocated can be processed in the cycle. However, though this method can accommodate more channels than that of the conventional method, simplification or omission of the processing for channels may degrade the quality of the processing result.

In the conventional multiple DSP VoP system as shown in FIG. 1, each DSP processes the allocated channels independently. Therefore, when the processing capacity of a predetermined DSP is not enough for processing its allocated channels, the processing of channels allocated to the DSP is omitted or simplified. As a result, the quality degradation can not be prevented.

SUMMARY OF THE INVENTION

The present invention provides a VoP system using a plurality of DSPs capable of accommodating a large number of channels and at the same time preventing quality degradation thereby, and a voice processing method in the system.

According to an aspect of the present invention, there is provided a voice over packet (VoP) system using a plurality of digital signal processors (DSPs) including: a voice over packet (VoP) system using a plurality of digital signal processors (DSPs) comprising: a plurality of first-stage DSPs which periodically process voice signal of calls corresponding to processing capacities allocated in advance, among calls input from a circuit network, and output packets corresponding to the voice signal; a plurality of first memories which are disposed corresponding to the plurality of first-stage DSPs, respectively, and store feature data obtained from the voice signal of calls processed by the plurality of first-stage DSPs, respectively; a second memory which stores identification data, voice signal, and feature data obtained in the processes of the previous cycle, of calls exceeding the processing capacity of first-stage DSPs among the calls from the circuit network; a second-stage DSP which performs coding voice signal stored in the second memory, outputs packets corresponding to the stored voice signals, and stores feature data obtained in the process of the voice signals, in the second memory; and a packet network interface which collects processing results of the first-stage DSPs and the second-stage DSP and distributes packets from a packet network to first-stage DSPs, wherein based on identification information added to the feature data stored in the second memory, each of the first-stage DSPs moves the feature data to the first memory disposed corresponding to the first-stage DSP.

According to another aspect of the present invention, there is provided a VoP system using a plurality of DSPs including: a plurality of first-stage DSPs which periodically process voice signal of calls corresponding to processing capacities allocated in advance, among calls from a circuit network, and output packets corresponding to the voice signal; a plurality of first memories which are disposed corresponding to the plurality of first-stage DSPs, respectively, and store feature data obtained from the voice signal of calls processed by the plurality of first-stage DSPs, respectively; and a packet network interface which collects processing results of the first-stage DSPs and distributes inputs from a packet network to first-stage DSPs, wherein the packet network interface comprises: a second memory which stores identification data, voice signal, and feature data obtained in the process of the previous cycle, of calls exceeding the processing capacity of first-stage DSPs among the calls from the circuit network; and a second-stage DSP which performs coding voice signal stored in the second memory, outputs packets corresponding to the stored voice signals, and stores feature data obtained in the process of the voice signals, in the second memory, wherein, based on identification information added to the feature data stored in the second memory, each of the first-stage DSPs moves the feature data to the first memory disposed corresponding to the first-stage DSP.

According to still another aspect of the present invention, there is provided a voice coding method in a VoP system using a plurality of first-stage DSPs and at least one second-stage DSP, the method including: measuring the number of calls that are in speech intervals, among calls input from a circuit network; comparing the measured number of calls that are in speech intervals, with a predetermined number of calls that are in speech intervals and are capable of being processed; if the measured number of calls that are in speech intervals exceeds the predetermined number of calls that are in speech intervals and are capable of being processed, selecting the same number of calls as the excess value among the calls from the circuit network; storing identification information, voice signal, and feature data obtained in the processes of the previous cycle, of the selected calls in a shared memory or in a memory disposed in a packet network interface apparatus; processing the voice signal stored in the shared memory or the memory disposed in the packet network interface apparatus, outputting packets corresponding to the stored voice signal, and storing feature data obtained in the process of the stored voice signal, in the shared memory or the memory disposed in the packet network interface apparatus; and based on identification information added to feature data stored in the shared memory or the memory disposed in the packet network interface apparatus, moving the feature data to a first memory disposed to the corresponding first-stage DSP.

According to the system and method, even though a number of calls, more than the number of calls based on the maximum processing capacity of each of first-stage DSPs, are allocated, the number of calls exceeding the number of calls that can be processed are processed in the second-stage DSP such that even with the increasing number of calls in the entire system, the probability of failure in processing calls is greatly lowered. In addition, the average usage ratio of first-stage DSPs increases compared to the conventional multiple DSP VoP system such that DSPs can be used efficiently.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 2:
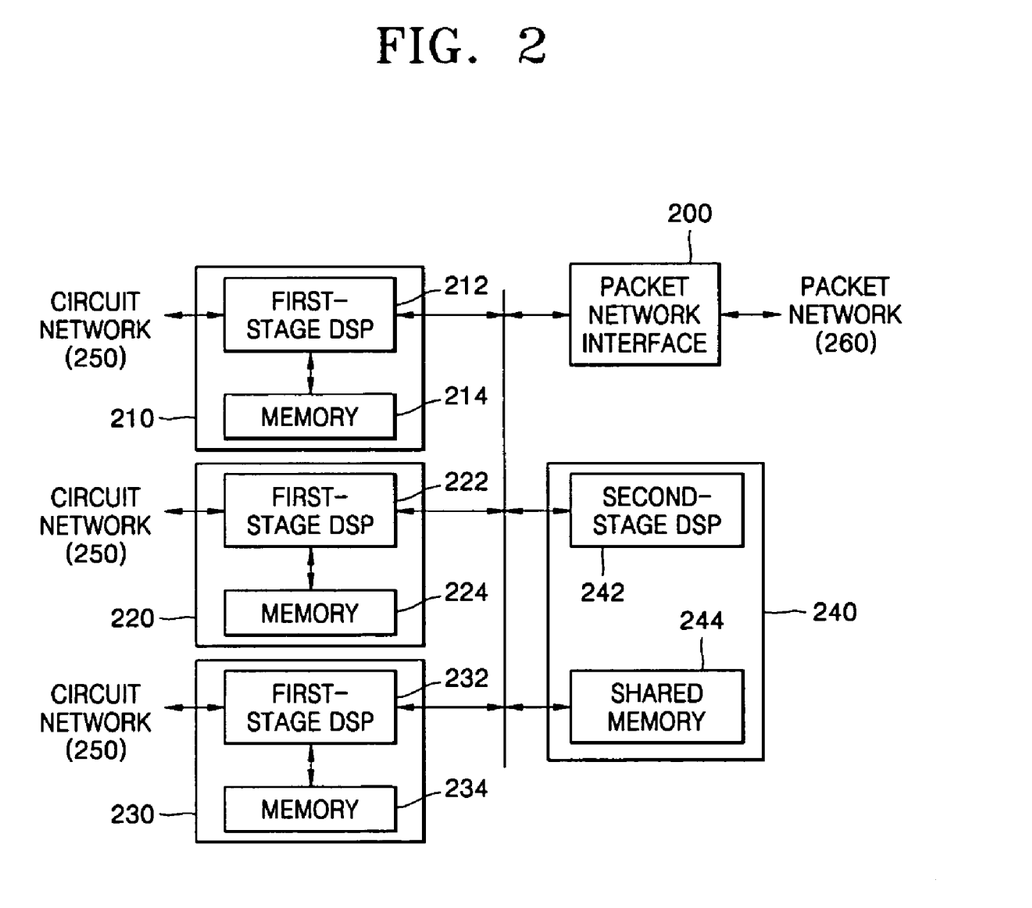
FIG. 2 is a diagram showing the structure of a preferred embodiment of a VoP system using a plurality of DSPs according to the present invention.

FIG. 2 is a diagram showing the structure of a preferred embodiment of a VoP system using a plurality of DSPs according to the present invention.

Referring to FIG. 2, a preferred embodiment of a VoP system using a plurality of DSPs according to the present invention includes a packet network interface 200, a plurality of first-stage DSP blocks 210, 220, and 230, and a second-stage DSP block 240. The packet network interface 200 provides an interface with a packet network. Each of the first-stage DSP blocks 210, 220, and 230 includes a first-stage DSP 212, 222, and 232 and a memory 214, 224, and 234, and is connected to the packet network interface 200 serially or in parallel.

To each of first-stage DSPs 212, 222, and 232, a number of calls are allocated. Allocation of calls is performed by a control unit (not shown) based on the processing capacity of each first-stage DSP 212, 222, and 232. In the present invention, it is assumed that the control unit of the VoP system allocates a number of calls to one DSP, the number greater than the number of calls that one DSP can process on the basis of the maximum processing load for each call. Each of the first-stage DSPs 212, 222, and 232 encodes voice signal of calls allocated to the DSP among calls input from the circuit network 250. Each of the first-stage DSPs 212, 222, and 232 performs voice activity detection (VAD) algorithm for allocated calls. Through this, each of the first-stage DSPs 212, 222, and 232 determines whether voice signal of each call is a speech interval or a silence interval, and based on the determination result, measures the number of calls that are in speech interval. If the number of calls in speech interval does not exceed a predetermined maximum number of calls, all calls are sequentially processed by corresponding first-stage DSPs 212, 222, and 232.

Feature data of calls extracted in processing voice signal by corresponding first-stage DSPs 212, 222, and 232 are stored in memories 214, 224, and 234 corresponding to respective first-stage DSPs 212, 222, and 232, and coded voices are transferred to the packet network interface 200. Because usual speech algorithms utilize the result of previous processing, the extracted feature data is stored and will be retrieved in the next cycle.

If the number of calls which is in speech interval exceeds a predetermined maximum number of calls, each of first-stage DSPs 212, 222, and 232 selects as many calls as its excessiveness, and stores identification information, input voice signal, and feature data obtained in the previous processing, of the selected calls, in the shared memory 244. The calls that Information of which Information stored in the shared memory 244 are processed by the second-stage DSP 242 and then, based on the identification information on each call, their resulting feature data are copied back to the memory 214, 224, and 234 of a corresponding first-stage DSP block 210, 220, and 230. Calls that are not selected to be processed by the second-stage DSP are sequentially processed by respective first-stage DSPs 212, 222, and 232.

The second-stage DSP block 240 includes the second-stage DSP 242 and the shared memory 244. The shared memory 244 provides a communication channel between the first-stage DSPs 212, 222, and 232, and the second-stage DSP 242. The second-stage DSP 242 has no allocated call. The second-stage DSP 242 periodically access the shared memory 244 and identifies whether there is a processing request from the first-stage DSPs 212, 222, and 232 and the number of requested calls. If the number of requested calls is less than the number of calls that can be processed in the second-stage DSP 242, the second-stage DSP 242 sequentially processes all the requested calls, and writes the feature data obtained as the result, in the shared memory 244 together with the identification information on calls. Meanwhile, if the number of requested calls is greater than the number of calls that can be processed in the second-stage DSP 242, the second-stage DSP 242 arbitrarily selects as many calls as its excessiveness. The second-stage DSP 242 omits the processing of the selected calls, writes feature data received from the first-stage DSPs 212, 222, and 232, in the shared memory 244 without change, and does not perform encoding the voice signal and transmitting the resulting values to the packet network 260. Meanwhile, the second-stage DSP 242 sequentially processes the calls that are not selected for omission, and transmits coded voices to the packet network 260 through the packet network interface 200. Also, feature data obtained as the result of encoding are written in the shared memory 244 together with identification information on each call.

Figure 3:
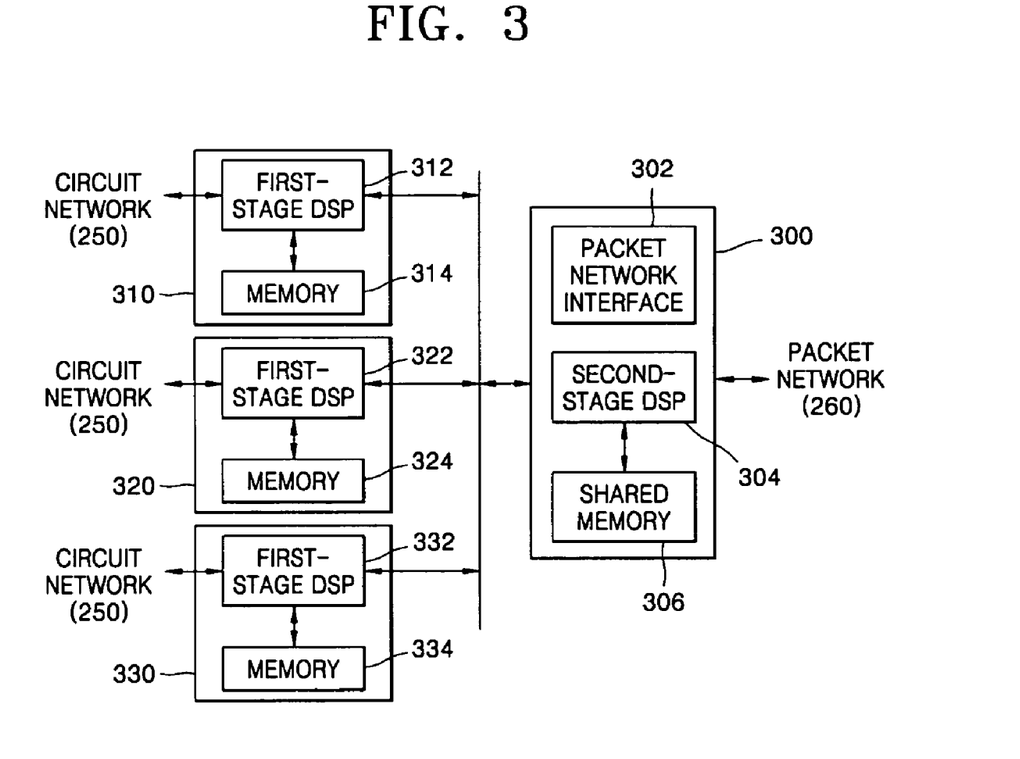
FIG. 3 is a diagram showing the structure of another preferred embodiment of a VoP system using a plurality of DSPs according to the present invention.

FIG. 3 is a diagram showing the structure of another preferred embodiment of a VoP system using a plurality of DSPs according to the present invention.

Referring to FIG. 3, the embodiment of a VoP system using a plurality of DSPs according to the present invention includes a packet network interface block 300, and a plurality of first-stage DSP blocks 310, 320, and 330. The packet network interface block 300 includes a packet network interface 302, a DSP 304, and a memory 306. The packet network interface 302 provides an interface with a packet network. The DSP 304 and the memory 306 embedded in the packet network interface block 300 perform the functions of the second-stage DSP 242 and the shared memory 246, respectively, shown in FIG. 2. The structure and function of each of the first-stage DSP blocks 310, 320, and 330 are the same as explained with reference to FIG. 2 and therefore detailed explanation will be omitted.

Figure 4:
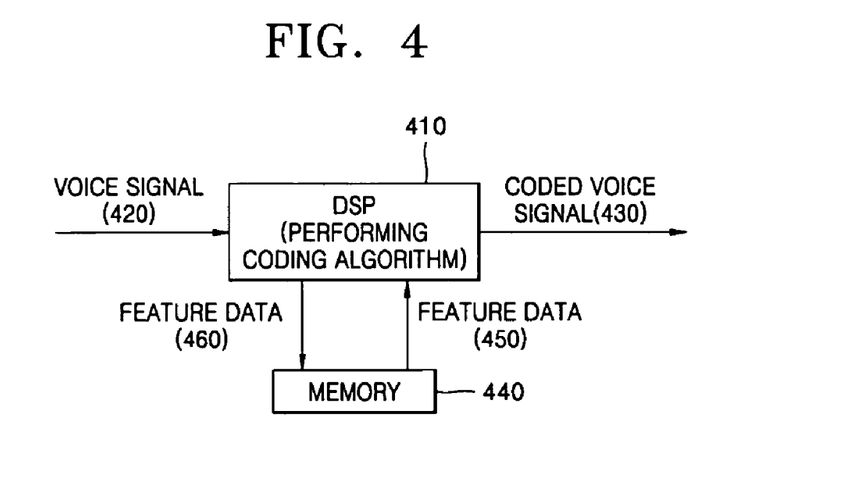
FIG. 4 is a diagram showing a voice coding process by a DSP employed in a VoP system using a plurality of DSPs according to the present invention.

FIG. 4 is a diagram showing a voice coding process by a DSP employed in a VoP system using a plurality of DSPs according to the present invention.

Referring to FIG. 4, a DSP 410 periodically executes a coding algorithm for voice signal 420 periodically input from a circuit network and feature data 450 obtained in the previous processing. Then, the DSP 410 calculates the number of calls that the coded voice signal 430 is voice interval, and transmits the coded voice signal to the packet network interface. Feature data 460 obtained during the execution of the coding algorithm are stored in a memory 440 for future processing. The processing capacity of the DSP 410 required for executing the coding algorithm for a call in speech interval can be calculated in advance. Based on the processing capacity of the DSP 410 calculated in advance and the estimated ratio between speech intervals and silence intervals, the control unit (not shown) of the VoP system determines the number of calls that can be processed by one DSP and according to this, allocates calls to be processed to the DSP.

Figure 5:
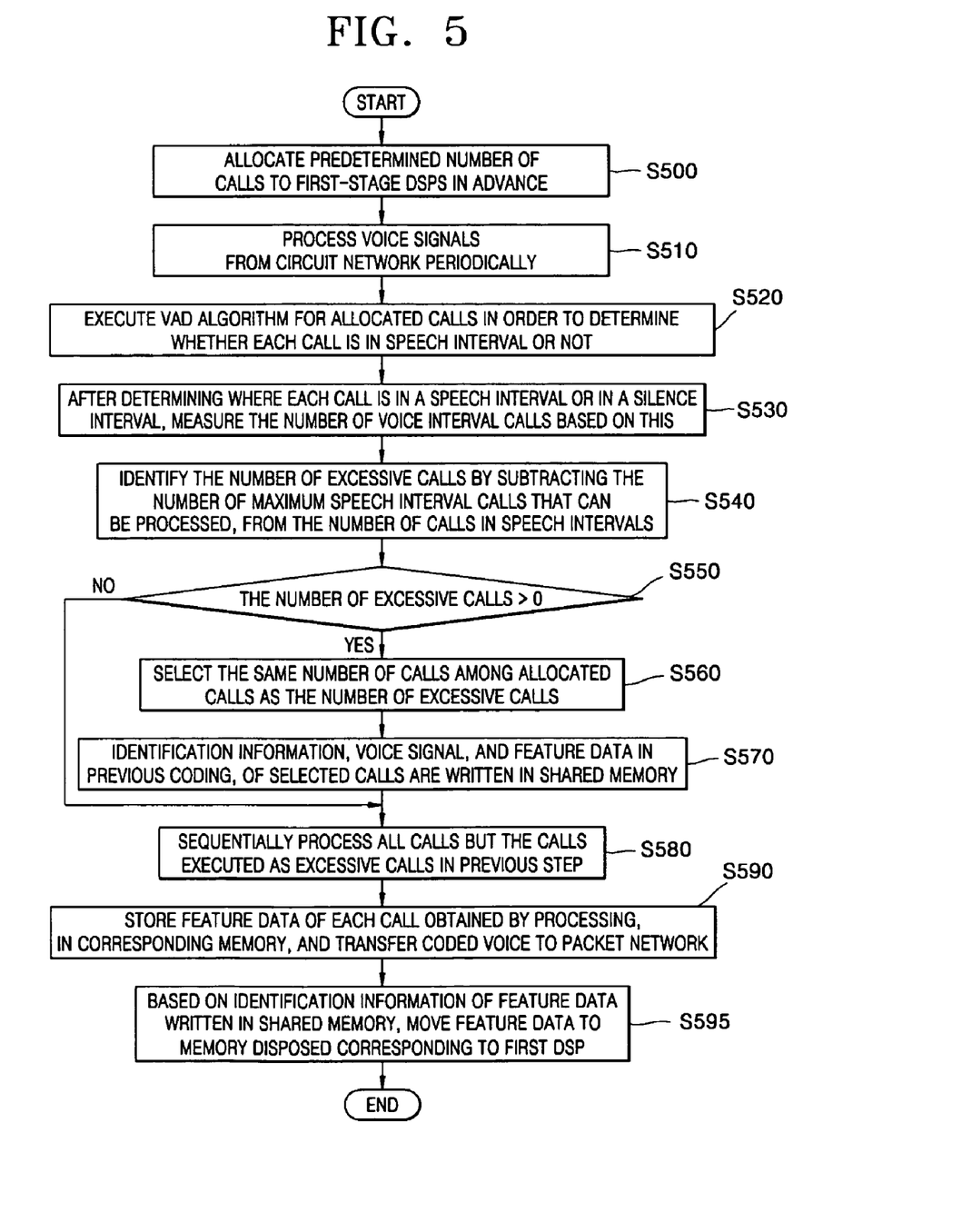
FIG. 5 is a flowchart of the operation steps performed by a first-stage DSP employed in a VoP system using a plurality of DSPs according to the present invention.

FIG. 5 is a flowchart of the operation steps performed by a first-stage DSP employed in a VoP system using a plurality of DSPs according to the present invention.

The control unit (not shown) of the VoP system allocates predetermined calls to the first-stage DSPs 212, 222, and 232 in advance in step S500. The first-stage DSPs 212, 222, and 232 periodically start processing of voice signals from the circuit network 250 in step S510. In each cycle, each of the first-stage DSPs 212, 222, and 232 executes the VAD algorithm for allocated calls in order to determine whether the voice signal of a call is a speech interval or a silence interval in step S520.

After determining whether each call is a speech interval or a silence interval by executing the VAD algorithm, the first-stage DSPs 212, 222, and 232 measure the number of calls in speech intervals based on the determination result in step S530. Then, the first-stage DSPs 212, 222, and 232 identify the number of calls exceeding the processing capacity, by subtracting the already known maximum number of calls in speech intervals that can be processed, from the number of input calls that are voice intervals in step S540.

If there are calls exceeding the processing capacity in step S550, the first-stage DSP 212, 222, and 232 arbitrarily select as many number of calls among the allocated calls as the number of calls exceeding the processing capacity in step S560. Identification information, input voice signal, and feature data obtained in the previous encoding process, of the selected calls are written in the shared memory 244 in step S570. The first-stage DSPs 212, 222, and 232 sequentially process all calls that are not selected in the step S560 in step S580. Then, the first-stage DSPs 212, 222, and 232 store feature data of each call obtained as the processing results, in memories 214, 224, and 234 corresponding to the first-stage DSPs 212, 222, and 232, respectively, and transfer coded voices to the packet network interface 200 in step S590. Unlike this, if there are no calls exceeding the processing capacity in step S550, the first-stage DSPs 212, 222, and 232 perform steps S580 and S590 for all calls. Next, the first-stage DSPs 212, 222, and 232 move feature data that are obtained in the coding process by the second-stage DSP 242 to be explained later, of voice signal corresponding to calls selected in the step S560 and are stored in the shared memory 244, to memories 214, 224, and 234 disposed corresponding to the first-stage DSPs 212, 222, and 232, respectively, in step S595.

Figure 6:
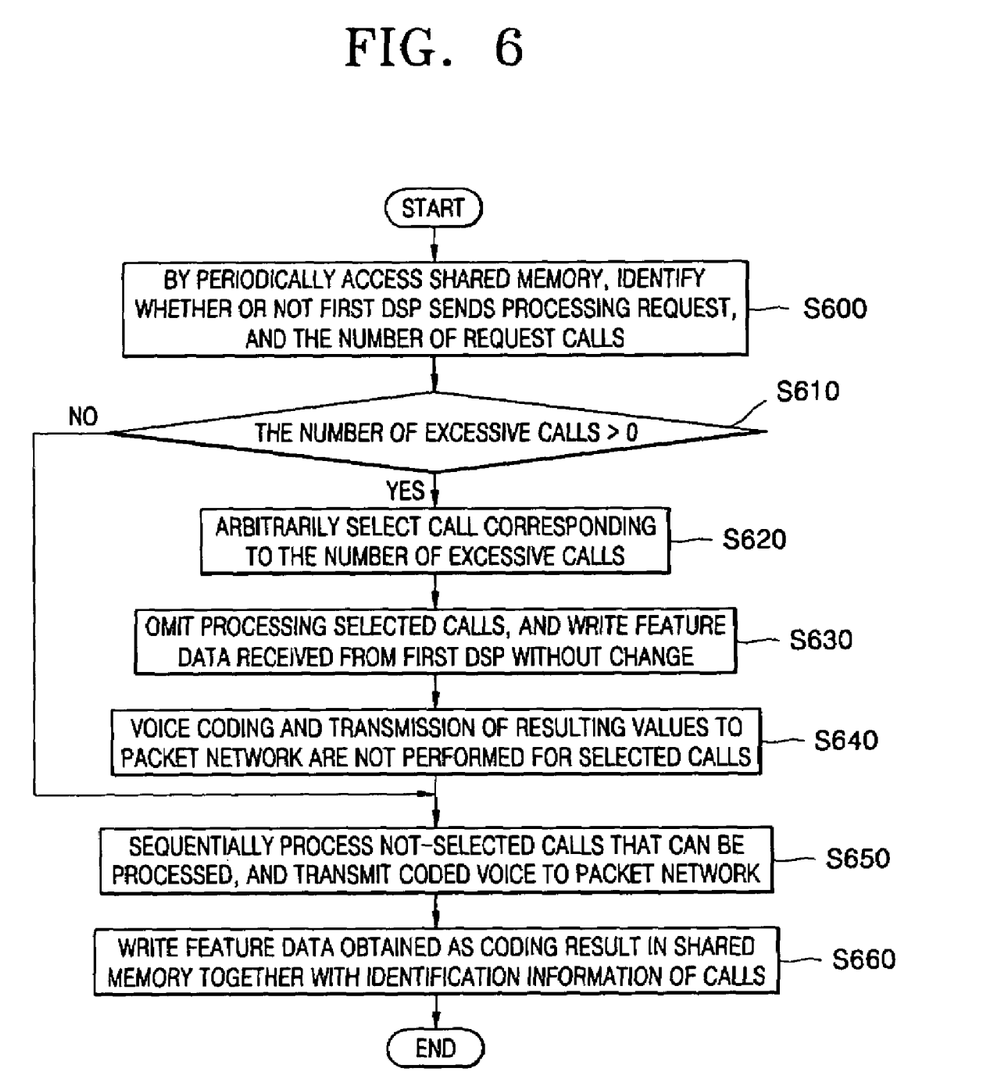
FIG. 6 is a flowchart of the operation steps performed by a second-stage DSP employed in a VoP system using a plurality of DSPs according to the present invention.

FIG. 6 is a flowchart of the operation steps performed by a second-stage DSP employed in a VoP system using a plurality of DSPs according to the present invention.

The second-stage DSP 242 periodically accesses the shared memory 244 and identifies whether there is a processing request from the first-stage DSPs 212, 222, and 232, and the number of requested calls in step S600. If the number of requested calls is greater than the number of calls that can be processed in the second-stage DSP 242 in step S610, the second-stage DSP 242 arbitrarily selects the same number of calls as the number of exceeding calls in step S620. The second-stage DSP 242 omits the processing of the selected calls, writes feature data received from the first-stage DSPs 212, 222, and 232, in the shared memory 244 without change in step S630, and does not execute encoding the voice and transmitting the resulting values to the packet network 260 in step S640. Unlike this, the second-stage DSP 242 sequentially processes all the calls that are not selected to be omitted, and transmits coded voices to the packet network 260 through the packet network interface 200 in step S650. Also, the second-stage DSP 242 writes feature data obtained as the result of coding in the shared memory 244 together with identification information on calls in step S660. If the number of requested calls is less than the number of calls that can be processed in the second-stage DSP 242 in step S610, the second-stage DSP 242 performs steps S650 and S660 for all requested calls.

Figure 7:
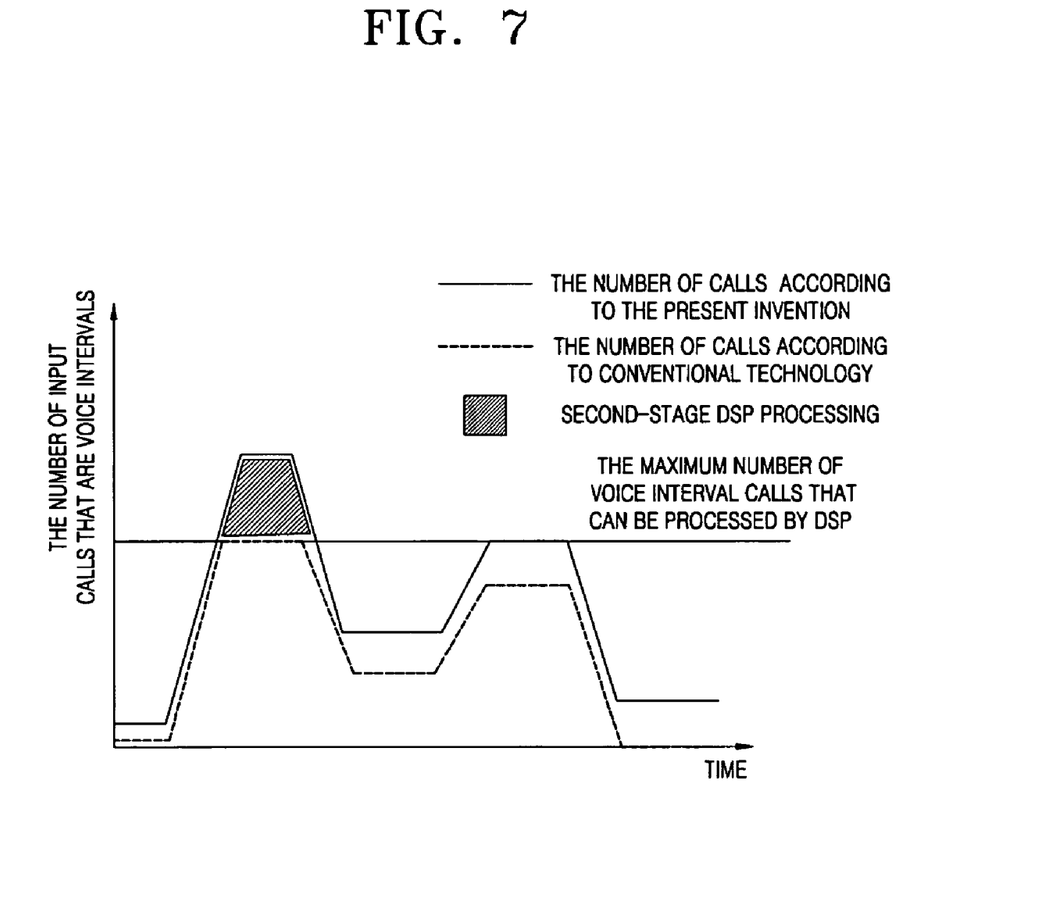
FIG. 7 is a diagram showing the voice processing results by the conventional voice processing method and a voice processing method according to the present invention.

FIG. 7 is a diagram showing the voice processing results by the conventional voice processing method and a voice processing method according to the present invention.

Referring to FIG. 7, by using the second-stage DSP, the voice processing method according to the present invention can additionally process calls corresponding to the shaded area 710 compared to the conventional voice processing method.

The preferred embodiments should be considered in descriptive sense only and not for purposes of limitation. Therefore, the scope of the invention is defined not by the detailed description of the invention but by the appended claims, and all differences within the scope will be construed as being included in the present invention.

According to the VoP system using a plurality of DSPs and a voice processing method in the system according to the present invention, a separate second-stage DSP to which no predetermined calls are allocated and which processes calls that cannot be processed due to the shortage of processing capacities of other DSPs, is additionally used. By doing so, even though a number of calls, more than the maximum number of calls based on the maximum processing capacity of each of first-stage DSPs, are allocated, the number of calls exceeding the number of calls that can be processed are processed in the second-stage DSP such that even with the increasing number of calls in the entire system, the probability of failure in processing calls is greatly lowered. In addition, the average usage ratio of first-stage DSPs increases compared to the conventional multiple DSP VoP system such that DSPs can be used efficiently. Furthermore, when a separate second-stage DSP is added, the cost for constructing a system increases, but if a DSP embedded in a packet network interface is used, without adding a separate hardware component, the system can process more calls. An example of this packet network interface device is MSC8101 chip from Motorola.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A voice over packet (VoP) system using a plurality of digital signal processors (DSPs) comprising:
    a plurality of first-stage DSPs, each DSP periodically processing voice signals of calls which are allocated in advance to each first-stage DSP based on processing capacity of each first-stage DSP, among calls input from a circuit network, and output packets corresponding to the voice signals;
    a plurality of first memories corresponding to the plurality of first-stage DSPs, respectively, and store feature data obtained from the voice signals of calls processed by the plurality of first-stage DSPs, respectively;
    a second memory which stores identification data, voice signals, and feature data obtained in the processes of a previous cycle, of calls exceeding the processing capacity of first-stage DSPs among the calls from the circuit network;
    a second-stage DSP which performs coding of voice signals stored in the second memory, outputs packets corresponding to the stored voice signals, and stores feature data obtained in the process of the voice signals, in the second memory; and
    a packet network interface which collects processing results of the first-stage DSPs and the second-stage DSP and distributes packets from a packet network to first-stage DSPs, wherein based on identification information added to the feature data stored in the second memory, each of the first-stage DSPs moves the feature data to the first memory disposed corresponding to the first-stage DSP.

2. The VoP system of claim 1, wherein the number of calls which are allocated to each first-stage DSP is greater than the number of calls which each first-stage DSP is capable of processing, and wherein the number of calls which each first-stage DSP is capable of processing is determined on the basis of the maximum processing load.

3. The VoP system of claim 1, wherein by performing a voice activity detection (VAD) algorithm for voice signal of calls form the circuit network, each first-stage DSP determines whether each call is in a speech interval or a silence interval, and based on the determination result, measure the number of calls that are in speech intervals, and if the number of calls in the speech interval exceeds a predetermined maximum number for the first-stage DSP, the first-stage DSP stores identification information, voice signals, and feature data obtained in the previous cycle, of calls exceeding the processing capacity of the corresponding first-stage DSP, to the second memory.

4. The VoP system of claim 1, wherein if a number of calls, stored in the second memory exceeds a number of calls which the second-stage DSP is capable of processing, the second-stage DSP processes the number of calls that the second-stage DSP is capable of processing, and transmits the coded data to the packet network interface.

5. A VoP system using a plurality of DSPs comprising:
a plurality of first-stage DSPs, each DSP periodically processing voice signals of calls which are allocated in advance to each first-stage DSP based on processing capacity of each first-stage DSP, among calls from a circuit network, and output packets corresponding to the voice signals;
a plurality of first memories corresponding to the plurality of first-stage DSPs, respectively, and store feature data obtained from the voice signals of calls processed by the plurality of first-stage DSPs, respectively; and
a packet network interface which collects processing results of the first-stage DSPs and distributes inputs from a packet network to first-stage DSPs, wherein the packet network interface comprises:
a second memory which stores identification data, voice signals, and feature data obtained in the process of a previous cycle, of calls exceeding the processing capacity of first-stage DSPs among the calls from the circuit network; and
a second-stage DSP which performs coding of voice signals stored in the second memory, outputs packets corresponding to the stored voice signals, and stores feature data obtained in the process of the voice signals, in the second memory, wherein, based on identification information added to the feature data stored in the second memory, each of the first-stage DSPs moves the feature data to the first memory disposed corresponding to the first-stage DSP.

6. The VoP system of claim 5, wherein the number of calls which are allocated to each first-stage DSP is greater than the number of calls which each first-stage DSP is capable of processing, and wherein the number of calls which each first-stage DSP is capable of processing is determined on the basis of the maximum processing load.

7. The VoP system of claim 5, wherein by performing a voice activity detection (VAD) algorithm for voice signals of calls form the circuit network, each first-stage DSP determines whether each call is in a speech interval or a silence interval, and based on the determination result, measure the number of calls that are in speech intervals, and if the number of calls in the speech interval exceeds a predetermined maximum number of calls for the first-stage DSP, the first-stage DSP stores identification information, voice signal, and feature data obtained in the previous cycle, of calls exceeding the processing capacity of the corresponding first-stage DSP, to the second memory.

8. The VoP system of claim 5, wherein if a number of calls stored in the second memory exceeds a number of calls which the second-stage DSP is capable of processing, the second-stage DSP processes the number of calls that the second-stage DSP is capable of processing, and transmits the coded data to the packet network interface.

9. A voice coding method in a VoP system using a plurality of first-stage DSPs and at least one second-stage DSP, the method comprising:
measuring the number of calls that are in speech intervals, among calls from a circuit network;
comparing the measured number of calls that are in speech intervals, with a predetermined number of calls that are in speech intervals and are capable of being processed;
if the measured number of calls exceeds the predetermined number of calls, selecting calls exceeding the predetermined number of calls among the calls input from the circuit network;
storing identification information, voice signal, and feature data obtained as a result of a previous process cycle, of the selected calls in a shared memory or in a memory disposed in a packet network interface apparatus;
processing the voice signal stored in the shared memory or the memory disposed in the packet network interface apparatus, outputting packets corresponding to the stored voice signal, and storing feature data obtained in the process of the stored voice signal, in the shared memory or the memory disposed in the packet network interface apparatus; and
based on identification information added to feature data stored in the shared memory or the memory disposed in the packet network interface apparatus, moving the feature data to a first memory disposed to the corresponding first-stage DSP.

10. The voice coding method of claim 9, wherein measuring the number of calls which are in speech intervals is performed after determining whether each call is in the speech interval or the silence interval by performing a voice activity detection (VAD) algorithm for calls from the circuit network.

11. The voice coding method of claim 9, wherein if the measured number of calls are in speech intervals is equal to or less than the predetermined number of calls that are in the speech interval and are capable of being processed, calls input from the circuit network are sequentially processed, feature data of each call obtained as the processing result is stored in a memory corresponding to each DSP, and coded voice is transferred to a packet network through a packet network interface.

12. The voice coding method of claim 9, wherein processing the voice signal, outputting packets and storing feature data comprises:
accessing periodically the shared memory or the memory disposed in a packet network interface apparatus, and identifying whether or not there is a request for processing voice signal, and the number of requested calls; and
if the requested number of calls is equal to or less than the predetermined number of calls that are in speech intervals and are capable of being processed, calls input from the circuit network are sequentially processed, feature data of each call obtained as the processing result is stored together with identification information, in the shared memory or the memory disposed in a packet network interface apparatus, and coded voice is transferred to a packet network through a packet network interface.

13. The voice coding method of claim 9, wherein performing coding the voice signal, outputting packets and storing feature data comprises:
accessing periodically the shared memory or the memory disposed in the packet network interface apparatus, and identifying whether or not there is a request for processing voice signal, and the number of requested calls; and if the requested number of calls that are in speech intervals exceeds a predetermined number of calls that are in speech intervals and are capable of being processed, selecting the same number of calls as the excess value without performing coding the voice signal stored in the shared memory or the memory disposed in the packet network interface apparatus, and sequentially processing the calls that are capable of being processed and are not selected, and storing feature data together with identification information, of each call obtained as the processing result, in the shared memory or the memory in the packet network interface apparatus, and transferring coded voice to a packet network through a packet network interface.

* * * * *